United States Patent

Armbrust et al.

[11] Patent Number: 5,209,146
[45] Date of Patent: May 11, 1993

[54] BALL LOCK APPARATUS FOR SMALL DIAMETER TOOLHOLDERS

[75] Inventors: William D. Armbrust, Cary; Harold J. Royal, Raleigh, both of N.C.

[73] Assignee: Kennametal Inc., Latrobe, Pa.

[21] Appl. No.: 777,885

[22] Filed: Oct. 15, 1991

[51] Int. Cl.⁵ .............................................. B23B 29/00
[52] U.S. Cl. .................... 82/160; 279/2.23; 409/234
[58] Field of Search ............ 82/158, 159, 160, 161; 409/232, 234; 279/2.21, 2.23, 2.24

[56] References Cited

U.S. PATENT DOCUMENTS

| | | | |
|---|---|---|---|
| 1,509,857 | 9/1924 | Zeh . | |
| 2,232,340 | 7/1938 | Olson | 51/241 |
| 3,302,960 | 2/1967 | Herrmann | 287/119 |
| 3,477,333 | 11/1969 | Boyd et al. | 85/5 |
| 3,498,653 | 3/1970 | McCreery | 287/119 |
| 4,135,418 | 1/1979 | McCray et al. | 82/36 A |
| 4,197,771 | 4/1980 | Heaton et al. | 82/36 B |
| 4,225,263 | 9/1980 | Asberg | 403/326 |
| 4,228,705 | 10/1980 | Heisner | 82/36 R |
| 4,232,607 | 11/1980 | Benson | 102/56 R |
| 4,234,277 | 11/1980 | Benson et al. | 408/226 |
| 4,238,978 | 12/1980 | Leone | 81/480 |
| 4,252,006 | 2/1981 | Swisher | 70/34 |
| 4,350,463 | 9/1982 | Friedline | 409/234 |
| 4,655,655 | 4/1987 | Schürfeld | 409/232 |
| 4,708,040 | 11/1987 | Erickson | 82/36 B |
| 4,735,532 | 4/1988 | Hunt | 409/232 X |
| 4,876,932 | 10/1989 | Nessel | 82/158 |
| 4,913,606 | 4/1990 | Glaser | 82/159 X |
| 4,932,295 | 6/1990 | Erickson | 82/160 |

*Primary Examiner*—Z. R. Bilinsky
*Attorney, Agent, or Firm*—James G. Porcelli

[57] ABSTRACT

A cutting toolholder assembly for holding a cutting tool used in a material removal operation. The assembly comprises a locking component which contains a bore with at least one recess therein. The assembly also includes a tool holding component with a shank whereby the bore receives the shank. The shank contains a compartment with a locking assembly within the compartment. The locking assembly includes at least one locking member and a positioner assembly that selectively positions the locking member into engagement with its corresponding recess. The recess corresponds to the shape of the locking member such that when the locking member engages the recess, the recess restrains the locking member so that there is essentially no movement between the holder component and the locking component during a material removal operation.

24 Claims, 3 Drawing Sheets

BALL LOCK APPARATUS FOR SMALL DIAMETER TOOLHOLDERS

BACKGROUND OF THE INVENTION

The invention relates to a cutting toolholder assembly. More specifically, the invention relates to an improved cutting toolholder assembly, especially for small diameter toolholders, comprising a locking component that firmly holds a detachable tool holding component against movement relative to the locking component during the material removal operation.

DESCRIPTION OF THE RELATED ART

U.S. Pat. No. 3,498,653 to McCreery, assigned to Kennametal Inc. who is the assignee of the present application, describes a connector device for cutting tools. This device includes a hollow shank that contains an interior annular groove. The end of the bar carries a ball lock assembly which uses a center ball to push a trio of balls into engagement with the annular groove.

U.S. Pat. No. 4,135,418 to McCray, assigned to the assignee of the present application, describes a clamping device for clamping a tool to a turret. The tool carries a ball lock mechanism which one activates with a mechanism within the turret.

U.S. Pat. No. 4,197,771 to Heaton et al., assigned to the assignee of the present application, describes a quick change device for mounting a tool in a support such a turret. The tool carries a ball lock assembly which activates the locking action through the rotation of a threaded screw.

U.S. Pat. No. 4,350,463 to Friedline, assigned to the assignee of the present application, describes an arrangement for mounting a cutter to a power driven spindle where both have the same axis of rotation. The cutter carries a ball lock assembly which engages the spindle.

U.S. Pat. No. 1,509,857 to Zeh describes a lock for clutch striking pins that uses a ball arrangement for holding a striking pin. U.S. Pat. No. 2,232,340 to Olson describes a valve seat grinder assembly that uses a ball arrangement to accurately center the lower end of the pilot relative to the bore. U.S. Pat. No. 3,302,960 to Herrmann describes a ball lock arrangement which releases in response to a small unlocking force even when the locked members are subjected to high forces, such as in the launch of a rocket.

U.S. Pat. No. 3,477,333 to Boyd et al. describes a releasable fastening means that uses a ball arrangement with particular emphasis on a solenoidactuated mechanism.

U.S. Pat. No. 4,708,040 to Erickson, assigned in part to Kennametal Inc., describes a lock rod-ball arrangement for holding a toolholder.

U.S. Pat. No. 4,932,295 to Erickson, assigned to the assignee of the present application, describes an automatic clamping unit for receiving and holding a toolholder which uses a lock rod-ball arrangement.

U.S. Pat. No. 4,225,263 to Asberg shows a device for locking a male element in the bore of a female element. The bore contains a groove therein. The arrangement uses a nut engageable with a locking ring so that upon movement of the nut towards the locking ring, the locking ring is displaced radially outwardly to engage the groove.

U.S. Pat. No. 4,228,705 to Heisner shows a tool holding device for holding a cylindrical barrel in a cylindrical chamber. The barrel contains a V-groove with a split ring therein. The ring abuts the rear of the barrel so as to expand the ring upon the drawing of the parts together.

U.S Pat. No. 4,234,277 to Benson et al. shows a quick-change chuck arrangement for a drill. The arrangement uses a rotary spring-biased collar for manipulating ball elements in and out of retaining dimples.

U.S. Pat. No. 4,238,978 to Leone shows a torque wrench using a clutch with a clutch cam and a clutch ball held in a driving relationship by a spring.

U.S. Pat. No. 4,252,006 to Swisher shows a lock arrangement using balls that either retract or protrude depending upon the position of a multi-diameter locking shaft.

SUMMARY OF THE INVENTION

It is a principal object of the present invention to provide an improved cutting toolholder assembly.

It is another object of the present invention to provide an improved cutting toolholder assembly that has a minimum number of parts thereby reducing the complexity of manufacture and increasing the ease of assembly and operation.

It is another object of the present invention to provide an improved cutting toolholder assembly comprising a detachable tool holding component that securely attaches to a locking component so that during a material removal operation the holder component does not move relative to the locking component.

It is another object of the present invention to provide an improved cutting toolholder assembly comprising a detachable tool holding component that securely attaches to a locking component so that during a material removal operation the holder component does not torque relative to the locking component.

It is another object of the present invention to provide an improved cutting toolholder assembly comprising a detachable tool holding component that securely attaches to a locking component so that during a material removal operation the holder component does not move longitudinally with respect to the locking component It is still another object of the present invention to provide an improved cutting toolholder assembly comprising a detachable tool holding component that securely attaches to a locking component where the holding component easily and quickly detaches from the locking component.

It is still another object of the present invention to provide an improved cutting toolholder assembly comprising a detachable tool holding component that automatically aligns itself with the locking component upon attachment.

It is still another object of the present invention to provide an improved cutting toolholder assembly comprising a detachable tool holding component and a locking component where the locking mechanism of the tool holding component is protected from contamination.

Finally, it is another object of the present invention to provide an improved cutting toolholder assembly comprising a detachable tool holding component that securely attaches to a locking component that provides a secure attachment for a small diameter (less than 1 inch) tool holding component and locking component.

In one form thereof, the invention is a cutting toolholder assembly for holding a cutting tool used in a material removal operation. The assembly comprises a locking component containing a bore substantially defined by a bore wall. The bore has an opening at one end thereof The bore wall contains at least one recess therein.

A tool holding component includes a shank whereby the bore receives the shank. The shank contains a compartment. A locking assembly includes at least one locking member and positioning means for positioning the locking member into engagement with its corresponding recess. The recess is of a configuration corresponding to the shape of the locking member such that when the locking member engages the recess, the recess restrains the locking member so that there is essentially no movement between the holder component and the locking component during a material removal operation.

In another form thereof, the invention is a cutting toolholder assembly which comprises a locking component which has a central longitudinal axis. The locking component contains a generally cylindrical bore substantially defined by a bore wall. The bore has an opening at one end thereof and a central longitudinal axis that is not coaxial with the central longitudinal axis of the locking component so that a portion of the bore wall is thicker than the average thickness of the bore wall. The bore wall contains at least one recess in the portion thereof that is thicker than the average thickness of the bore wall.

The assembly further includes a holding component including a generally cylindrical shank which the bore receives. The shank contains a locking assembly which includes at least one locking member and means for moving the locking member into engagement with its corresponding recess.

In still another a form thereof, the invention is a cutting toolholder assembly for holding a cutting tool used in a material removal operation. The assembly comprises a locking component which has a central longitudinal axis. The locking component contains a bore substantially defined by a bore wall. The bore has an opening at one end thereof and a central longitudinal axis that is not coaxial with the central longitudinal axis of the locking component. The bore wall contains at least one recess therein.

A holding component includes a shank whereby the bore receives the shank. The shank contains a compartment. A locking assembly is within the compartment. The locking assembly includes at least one locking member and positioning means for positioning the locking member into engagement with its corresponding recess.

The recess is of a configuration corresponding to the shape of the locking member such that when the locking member engages the recess, the recess restrains the locking member so that there is essentially no movement between the holder component and the locking component during a material removal operation.

BRIEF DESCRIPTION OF THE DRAWINGS

The foregoing and other aspects of the present invention will become more apparent upon review of the following detailed description of the invention in conjunction with the brief description of the drawings below.

DETAILED DESCRIPTION OF SPECIFIC EMBODIMENTS

Figure 1:
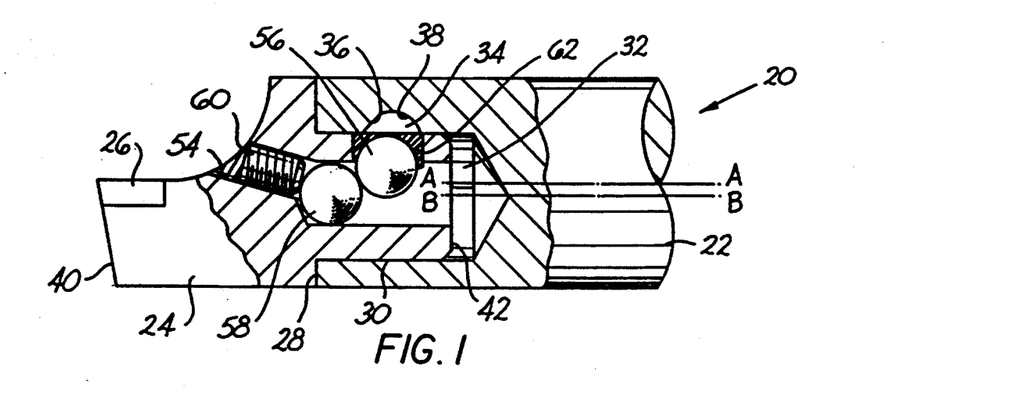
FIG. 1 is a side view of one specific embodiment of the cutting toolholder assembly with a portion removed to illustrate the one locking ball and associated structure in an unlocked condition.
Figure 2:
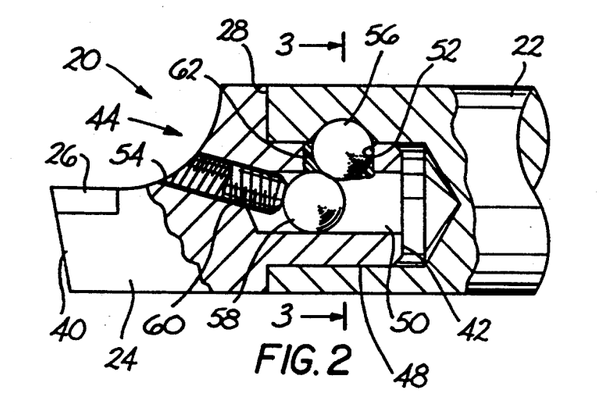
FIG. 2 is a side view of the specific embodiment of FIG. 1 with the locking ball and associated structure illustrated in a locked condition.
Figure 3:
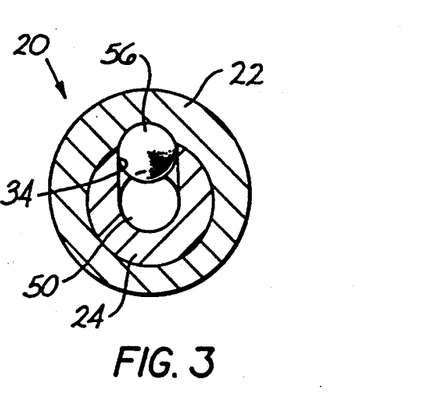
FIG. 3 is cross-sectional view of the specific embodiment of FIG. 2 taken along section line 3—3.

Referring to the drawings, FIGS. 1, 2 and 3 illustrate a first specific embodiment of the cutting toolholder assembly, generally designated as 20. The cutting tool assembly includes two very basic components.

The first component is a locking component 22 which connects to a stationary member (not illustrated) such as a turret or the like used in conjunction with a lathe (not illustrated) or the like. The second component is a tool holding component 24 that detachably connects to the locking component 22 as described hereinafter. The tool holding component 24 carries a cutting tool insert 26 which engages stock material (not illustrated) so as to remove material during a material removal operation.

The locking component 22 is of a general cylindrical shape so as to have a generally circular cross-section and a central longitudinal axis A—A. The locking component 22 further includes opposite ends, one end 28 of which the drawings illustrate via FIGS. 1 and 2.

The locking component 22 presents an elongate bore wall 30 that defines a bore 32 which opens adjacent to the one end 28 of the locking component 22. The bore 32 has a central longitudinal axis B—B. The central longitudinal axis B—B of the bore 32 is not coaxial of the central longitudinal axis A—A of the locking component 22. As a result of the abaxial relationship between the central longitudinal axes (B—B and A—A, respectively) of the bore 32 and locking component 22, the bore wall 30 has portions thereof which are thicker than the average thickness of the bore wall 30 as shown by FIG. 3. The average thickness of the bore wall 30 is the bore wall thickness if the central longitudinal axes of the bore and the locking component were coaxial.

The locking component 22 further contains a recess 34 in the bore wall 30 axially rearward (to the right as shown in FIGS. 1 and 2) from the mouth of the bore 32. The recess 34 is in the portion of the bore wall 30 that is the thickest as shown by FIG. 3.

The recess 34 is of a generally circular configuration when one views the recess in a cross-section transverse to the longitudinal axis A—A of the locking component 22, i.e. transverse cross-section, such as illustrated by FIG. 3. The recess 34 presents two distinct portions when one views the recess 34 in a longitudinal cross-section, such as shown by FIGS. 1 and 2. These portions are a ramp portion 36 having an inclination of about 45 degrees from the central longitudinal axis B—B of the bore 32 and a spherical portion 38. The ramp portion 36 is axially outward (to the left in FIGS. 1 and 2) of the spherical portion 38.

The tool holding component 24 includes opposite ends 40, 42. The cutting tool insert 26 attaches to the tool holding component 24 at the one end 40 thereof. The other end 42 of the tool holding component 24 presents a locking assembly 44.

The locking assembly 44 includes a cylindrical shank 48 which has a central longitudinal axis. The diameter of the shank 48 corresponds to the diameter of the bore 32 so that the bore 32 snugly receives the shank 48.

The shank 48 contains a generally cylindrical compartment 50. The shank 48 further contains a cylindrical aperture 52 transverse to the longitudinal axis of the shank 48. The aperture 52 communicates with the compartment 50. The locking assembly 44 also includes a threaded bore 54 in the tool holding component 24. The threaded bore 54 is inclined at an acute angle from the central longitudinal axis of the shank 48.

The locking assembly 44 further includes a locking ball 56, a portion of which is in the aperture 52 and the remaining portion of which selectively protrudes from the surface of the shank 48 as will be described hereinafter. The locking assembly 44 also includes a driver ball 58 within the volume of the compartment 50. The locking assembly 44 includes a threaded stud 60 which the threaded bore 54 receives. The compartment 50 contains caulking 62 or the like (e.g. Dow Corning silicone rubber sealant) which facilitates the retention of the balls (56, 58) within the compartment 50 and also prevents contamination of the compartment.

In operation, the locking assembly 44 may be in one of two basic positions. One of those positions is an unlocked position as shown in FIG. 1. In this position, the single locking ball 56 does not protrude from the aperture 52 past the surface of the shank 48. Thus, the locking ball 58 does not engage its corresponding recess 34 to provide any connection between the locking component 22 and the tool holding component 24. In this position, one may easily and quickly remove the tool holding component 24 from the locking component 22. Further, one may easily and quickly insert another tool holding component, which has the locking ball retracted, into position within the locking component 22.

The other position is the locked position as shown in FIGS. 2 and 3. To reach this position from the unlocked position, one rotates the threaded stud 60 in the threaded bore 58 so as to cause it to engage and push the driver ball 58 into contact with the locking ball 56. As one continues to rotate the threaded stud 60, the driver ball 58 continues to push the locking ball 56, and in turn, the locking ball 56 impinges the 45 degrees ramp portion 36. When the locking ball 56 impinges upon the ramp portion 36, the locking ball 56 moves axially rearward (to the right as shown in FIGS. 1 and 2) and radially outward until it is within the spherical portion 38 of the recess 34 so that the recess 34 now firmly restrains the locking ball 56 from movement in all directions.

The locking ball 56 is in locking contact with three surfaces; namely, the driver ball 58, the ramp portion 36 and cylindrical aperture 52. The angle between the locking ball 56 and the driver ball 58 provides a mechanical advantage to better secure the tool holding component 24 to the locking component 22.

Because of the abaxial relationship between the locking component and the bore 32, the bore wall 30 has thicker and thinner portions. Because the recess 34 is in the thickest portion of the bore wall 30, there is a sufficient mass of bore wall 30 to securely retain the tool holding component 24 in the locking component 22.

Because of this omnidirectional restraint of the locking ball 56, the tool holding component 24 does not torque or twist relative to the locking component 22 when the cutting tool insert 26 engages the stock material in a material removal operation. Further, the tool holding component 24 does not move longitudinally away from the locking component 22 due to the longitudinal stresses exerted upon the tool holding component 24 during a material removal operation. These longitudinal stresses attempt to pull the tool holding component 24 out of engagement with the locking component 22.

This assembly now provides for the steady positioning of the cutting tool insert 26 with respect to the stock material during the material removal operation.

The orientation of the single locking ball 56 and the requirement that it must register with the recess 34 in order to firmly connect provides for the proper alignment of the tool holding component 24 with respect to the locking component 22.

To move from the locked position to the unlocked position, one rotates the threaded stud 60 so that it moves away from the compartment 50 and its engagement with the driver ball 58. As this occurs, the locking ball 56 moves back into the aperture 52 and the compartment 50 until it no longer protrudes from the surface of the shank 48. At this point, one may easily and quickly remove the tool holding component 24 from the locking component 22.

Figure 4:
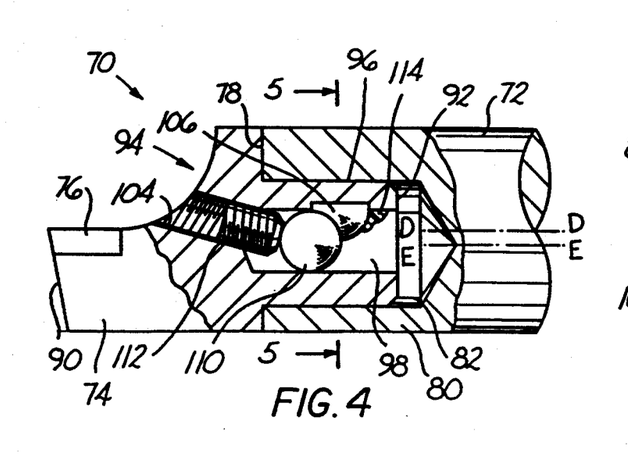
FIG. 4 is a side view of a second specific embodiment of the cutting toolholder assembly with a portion removed to illustrate the two of locking balls and associated structure in a locked condition.
Figure 5:
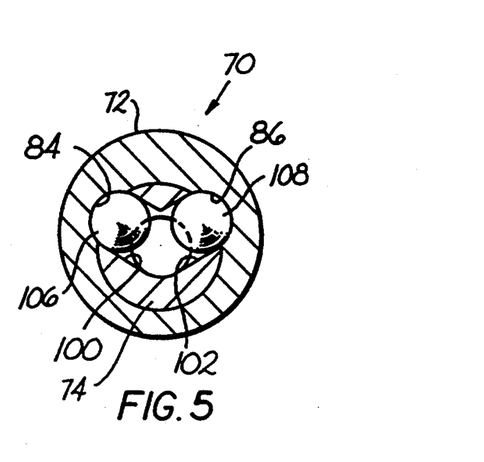
FIG. 5 is cross-sectional view of the specific embodiment of FIG. 4 taken along section line 5—5.

Referring to the drawings, FIGS. 4 and 5 illustrate a second specific embodiment of the cutting toolholder assembly, generally designated as 70. Like the first specific embodiment, this second embodiment of the cutting tool assembly includes two very basic components.

The first component is a locking component 72 which securely connects to a stationary member (not illustrated) such as a turret or the like used in conjunction with a lathe (not illustrated) or the like. The second component is a tool holding component 74 that detachably connects to the locking component 72 as described hereinafter. The tool holding component 74 carries a cutting tool insert 76 which engages stock material (not illustrated) so as to remove material during a material removal operation.

The locking component 72 is of a generally cylindrical shape so as to have a generally circular cross-section and a central longitudinal axis D—D. The locking component 72 further includes opposite ends, one end 78 of which the drawings illustrate via FIG. 4.

The locking component 72 presents a bore wall 80 which defines a bore 82 adjacent to the one end 78 of the locking component 72. The bore 82 has a central longitudinal axis E—E. The central longitudinal axis E—E of the bore 82 is not coaxial of the central longitudinal axis D—D of the locking component 72. As a result of the abaxial relationship between the central longitudinal axes (E—E, D—D) of the bore 82 and locking component 72, the bore wall 80 has portions thereof which are thicker than the average thickness of the bore wall as shown by FIG. 5. The average thickness of the bore wall is the bore wall thickness if the central longitudinal axes of the bore 82 and the locking component 72 were coaxial.

The locking component 72 further contains a pair of recesses 84, 86 in the bore wall 80 axially inward (to the right in FIG. 4) from the mouth of the bore 82. The recesses 84, 86 are about 120 degrees apart as shown by FIG. 5. The recesses 84, 86 are in portions of the bore wall 80 that are thicker than the average thickness of the bore wall 80. Each recess 84, 86 presents a shape that is the same as that of the recess in the first specific embodiment so that each recess 84, 86 has a ramp portion axially outward (to the left in FIG. 4) of a spherical portion. For the sake of brevity, the specification will not further describe the structure of these recesses 84, 86; however, the earlier description is applicable to the recesses 84, 86.

The tool holding component 74 includes opposite ends 90, 92. The cutting tool insert 76 attaches to the one end 90 of the holding component 74. The other end 92 of the holding component 74 presents a locking assembly 94.

The locking assembly 94 includes a cylindrical shank 96 which has a central longitudinal axis. The diameter of the shank 96 corresponds to the diameter of the bore 82 so that the bore 82 snugly receives the shank 96.

The shank 96 contains a generally cylindrical compartment 98. The shank 96 further contains a pair cylindrical apertures 100, 102, the disposition of which is generally transverse to the longitudinal axis of the shank 98. The apertures 100, 102 are also about 120 degrees apart as shown in FIG. 5. However, the angle between the apertures 100, 102 and the angle between the recesses 84, 86 may intentionally be slightly different to provide a wedging acting between the locking balls and the recesses 84, 86. The apertures 100, 102 communicate with the compartment 98.

The locking assembly 94 also includes a threaded bore 104 in the tool holding component 74. The threaded bore 104 is inclined at an acute angle from the central longitudinal axis of the shank 96. The threaded bore 104 communicates with the compartment 98.

The locking assembly 94 further includes a pair of locking balls 106, 108. For each locking ball 106, 108, a portion thereof is in its respective aperture (100, 102) and the remaining portion thereof selectively protrudes from the surface of the shank 98 as will be described hereinafter.

The locking assembly 94 also includes a driver ball 110 within the volume of the compartment 98. The locking assembly 94 includes a threaded stud 112 which the threaded bore 104 receives. The compartment 98 contains caulking 114 or the like (e.g. Dow Corning silicone rubber sealant) which facilitates the retention of the locking balls 106, 108 and driver ball 110 within the compartment 98. The caulking 114 also prevents contamination of the compartment 98.

The operation of this specific embodiment follows the same method as the first specific embodiment. This specific embodiment also provides the same advantages as does the first specific embodiment.

One may place the locking assembly 94 in either one of two positions; namely, the unlocked position (not illustrated) or the locked position as shown in FIGS. 4 and 5.

To place the locking assembly 94 in the locked position from the unlocked position, one rotates the threaded stud 112 to push the driver ball 110 into engagement with the pair of locking balls 106, 108. The continued rotation of the threaded stud 112 results in the continued pushing of the driver ball 110 which causes the locking balls 106, 108 to engage the ramp portion of their respective recesses 84, 86. The locking balls 106, 108 move axially rearward (to the right as shown in FIG. 4) and radially outwardly until they are within the spherical portion of their respective recess 84, 86. The recesses 84, 86 securely restrain their corresponding balls 106, 108 from movement in any direction.

Due to the angular difference between the disposition of the recesses 84, 86 and the apertures 100, 102, a wedging action occurs when the balls 106, 108 are secured in their respective recesses. This wedging action facilitates a secure connection between the cutting head and the locking component.

The omnidirectional restraint prevents the tool holding component 74 from any torque or longitudinal movement relative to the locking component 72 during the time the cutting tool insert 76 engages the stock material in the material removal operation. The assembly also provides for the alignment of the tool holding component with respect to the locking component.

To move the locking assembly from the locked to the unlocked position, one rotates the threaded stud 112 so that it moves away from the compartment 98 and the driver ball 110. The continued rotation of the threaded stud 112 allows the locking balls 106, 108 to retract into their respective apertures 100, 102 and the compartment 98 so that they no longer protrude from the surface of the shank 96. At this point, one may remove the tool holding component 74 from the locking component 72.

Figures 6, 7:
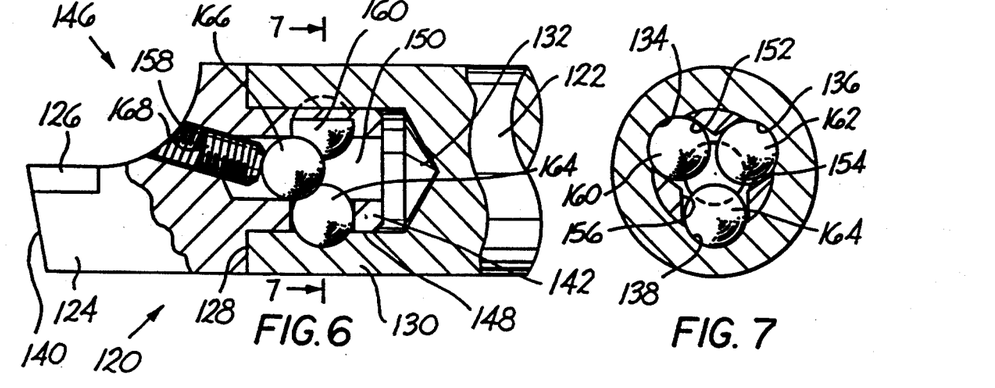
FIG. 6 is a side view of a third specific embodiment of the cutting toolholder assembly with a portion removed to illustrate the three locking balls and associated structure in a locked condition.
FIG. 7 is cross-sectional view of the specific embodiment of FIG. 6 taken along section line 7—7.

Referring to the drawings, FIGS. 6 and 7 illustrate a third specific embodiment of the cutting toolholder assembly, generally designated as 120. The cutting tool assembly 120 includes two very basic components.

The first component is a locking component 122 which securely connects to a stationary member (not illustrated) such as a turret or the like used in conjunction with a lathe (not illustrated) or the like. The second component is a tool holding component 124 that detachably connects to the locking component 122 as described hereinafter. The tool holding component 124 carries a cutting tool insert 126 which engages stock material (not illustrated) so as to remove material during a material removal operation.

The locking component 122 is of a generally cylindrical shape so as to have a generally circular cross-section and a central longitudinal axis. The locking component 122 further includes opposite ends, one end 128 of which the drawings illustrate via FIG. 6.

The locking component 122 presents a bore wall 130 which defines a bore 132 adjacent to the one end 128 of the locking component 122. The bore 132 has a central longitudinal axis. The central longitudinal axes of the bore 132 and the locking component 122 are coaxial.

The locking component 122 further contains a trio of recesses 134, 136, 138 in the bore Wall 130 axially inward (to the right as shown in FIG. 6) from the mouth of the bore 132. The recesses 134, 136, 138 are about 120 degrees apart as shown in FIG. 7.

Each recess 134, 136, 138 presents a shape that is the same as that of the recess in the first specific embodiment. Each recess has a ramp portion axially outwardly of a spherical portion. For the sake of brevity, the specification will not further describe the structure of these recesses 134, 136, 138; however, the earlier description is applicable to the recesses 134, 136, 138.

The tool holding component 124 includes opposite ends 140, 142. The cutting tool insert 126 attaches to one end 140 of the tool holding component 124. The other end 142 of the tool holding component 124 presents a locking assembly 146.

The locking assembly 146 includes a cylindrical shank 148 which has a central longitudinal axis. The diameter of the shank 148 corresponds to the diameter of the bore 132 so that the bore 132 snugly receives the shank 148.

The shank 148 contains a generally cylindrical compartment 150. The shank 148 further contains a trio cylindrical apertures 152, 154, 156 generally transverse to the longitudinal axis of the shank 148. The apertures 152, 154, 156 are also about 120 degrees apart as shown in FIG. 5. However, the angles between the apertures 152, 154, 156 and the angles between the recesses 134, 136, 138 may intentionally be slightly different to produce a wedging action between the locking balls and the recesses 134, 136, 138. The apertures 152, 154, 156 communicate with the compartment 150.

The locking assembly 146 also includes a threaded bore 158 in the tool holding component 124. The threaded bore 158 is at an included angle from the central longitudinal axis of the shank 148. The threaded bore 158 communicates with the compartment 150.

The locking assembly 146 further includes a trio of locking balls 160, 162, 164. For each locking ball 160, 162, 164, a portion thereof is in its respective aperture 152, 154, 156 and the remaining portion thereof selectively protrudes from the surface of the shank 148 as will be described hereinafter.

The locking assembly 146 also includes a driver ball 166 within the volume of the compartment 150. The locking assembly 146 includes a threaded stud 168 which the threaded bore 158 receives.

The operation of this specific embodiment follows the same method of operation as the first specific embodiment. One may place the locking assembly 146 in either one of two positions; namely, the unlocked position (not illustrated) or the locked position as shown in FIGS. 6 and 7.

To place the locking assembly 146 in the locked position from the unlocked position, one rotates the threaded stud 168 to push the driver ball 166 into engagement with the trio of locking balls 160, 162, 164. The continued pushing of the driver ball 166 causes the locking balls 160, 162, 164 to engage the ramp portion of their respective recesses 134, 136, 138. The locking balls 160, 162, 164 move axially rearward (to the right as shown in FIG. 6) and radially outwardly until within the spherical portions of their respective recesses so that the recesses 134, 136, 138 securely restrain their corresponding balls 160, 162, 164 from movement in any direction.

The omnidirectional restraint prevents the tool holding component 124 from any torque or longitudinal movement relative to the locking component 122 during the time the cutting tool insert 126 engages the stock material in the material removal operation. The advantage of proper alignment present in the earlier embodiments are true for this embodiment.

To move the locking assembly from the locked to the unlocked position, one rotates the threaded stud 168 so that it moves away from the compartment 150 and the driver ball 166. The continued rotation of the threaded stud 168 allows the locking balls 160, 162, 164 to retract into their respective apertures 152, 154, 156 and the compartment 150 so that they no longer protrude from the surface of the shank 148. At this point, one may easily and quickly remove the tool holding component 124 from the locking component 122.

Figure 8:
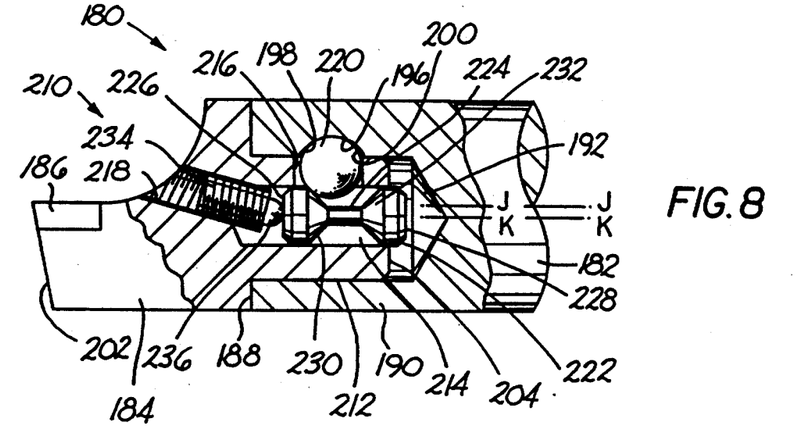
FIG. 8 is a side view of a fourth specific embodiment of the cutting toolholder assembly with a portion removed to illustrate one locking ball and associated structure in a locked condition.

Referring to the drawings, FIG. 8 illustrates a fourth specific embodiment of the cutting toolholder assembly, generally designated as 180. Like the earlier specific embodiments, the cutting tool assembly 180 includes two very basic components.

The first component is a locking component 182 which connects to a stationary member (not illustrated) such as a turret or the like used in conjunction with a lathe (not illustrated) or the like. The second component is a tool holding component 184 that detachably connects to the locking component 182 as described hereinafter. The tool holding component 184 carries a cutting tool insert 186 which engages stock material (not illustrated) so as to remove material during a material removal operation.

The locking component 182 is of a general cylindrical shape so as to have a generally circular cross-section and a central longitudinal axis J—J. The locking component 182 further includes opposite ends, one end 188 of which the drawings illustrate via FIG. 8.

The locking component 182 presents a bore wall 190 which defines a bore 192 adjacent to the one end 188 of the locking component 182. The bore 192 has a central longitudinal axis K—K. The central longitudinal axis K—K of the bore 192 is not coaxial of the central longitudinal axis J—J of the locking component 182. As a result of the abaxial relationship between the central longitudinal axes (K—K and J—J) of the bore 192 and locking component 182, the bore wall 190 has portions thereof which are thicker than the average thickness of the bore wall 190. The average thickness is the thickness of the bore wall 190 if the central longitudinal axes of the locking component 182 and the bore 192 were coaxial.

The locking component 182 further contains a recess 196 in the bore wall 190 axially inward (to the right as shown in FIG. 8) from the mouth of the bore 192. The recess 196 is in the portion of the bore wall 190 that is the thickest.

The recess 196 is of a generally circular configuration when one views the recess 196 in a cross-section transverse to the longitudinal axis J—J of the locking component 182. The recess 196 presents two distinct portions when one views the recess in a longitudinal cross-section, such a shown by FIG. 8. These portions are a ramp portion 198 having an inclination of about 45 degrees and a spherical portion 200. The ramp portion 198 is axially outward (to the left as shown in FIG. 8) of the spherical portion 200.

The tool holding component 184 includes opposite ends 202, 204. The cutting tool insert 186 attaches to one end 202 of the tool holding component 184. The other end 204 of the tool holding component 184 presents a locking assembly 210.

The locking assembly 210 includes a cylindrical shank 212 which has a central longitudinal axis. The diameter of the shank 212 corresponds to the diameter of the bore 192 so that the bore 192 snugly receives the shank 212.

The shank 212 contains a generally cylindrical compartment 214. The shank 212 further contains a cylindrical aperture 216 transverse to the longitudinal axis of the shank 212. The aperture 216 communicates with the compartment 214. The locking assembly 210 also includes a threaded bore 218 in the tool holding component 184. The threaded bore 210 communicates with the compartment 214 and is inclined at an acute angle from the central longitudinal axis of the shank 212.

The locking assembly 210 further includes a locking ball 220, a portion of which is in the aperture 216 and the remaining portion of which selectively protrudes from the surface of the shank 212 as will be described hereinafter.

The locking assembly 210 also includes a driver member 222 within the volume of the compartment 214. The driver member 222 has a hour-glass shape so that there is a mediate reduced diameter portion 224 between two enlarged diameter portions 226, 228. Corresponding frusto-conical portions 230, 232 join the mediate portion 224 to the enlarged diameter portions 226, 228, respectively. The frusto-conical portions 230, 232 provide ramping surfaces described hereinafter.

The locking assembly 210 includes a threaded stud 234 which the threaded bore 218 receives. A ball 236 is on the inward end of the threaded stud 234. The ball 236 engages the driver member 222.

This specific embodiment operates according to the same principles as the first embodiment, except that it uses an hour-glass shaped driver member 222 rather than a driver ball. In operation, one rotates the threaded stud 234 to move the ball 236 into engagement with the driver member 222. The axially outward (the left-hand one in FIG. 8) frusto-conical portion 230 engages the locking ball 220 and pushes it into engagement with the ramp portion 198 of the recess 196. After further pushing, the spherical portion 200 of the recess 196 receives the locking ball 220 so that the recess 196 securely restrains movement of the locking ball 220 in any direction. Thus, the is no relative torque or longitudinal movement between the tool holding component 184 and the locking component 182 during a material removal operation.

To move from the locked to the unlocked position, one rotates the threaded stud 234 so that it moves away from the driver member 222. The locking ball 220, which is under an axially outward and radially inward bias, retracts into the aperture 216 and compartment 214. The locking ball 220 continues to retract until it no longer protrudes past the surface of the shank 212. At this point, one may easily and quickly remove the tool holding component 184 from the locking component 182.

Figure 9:
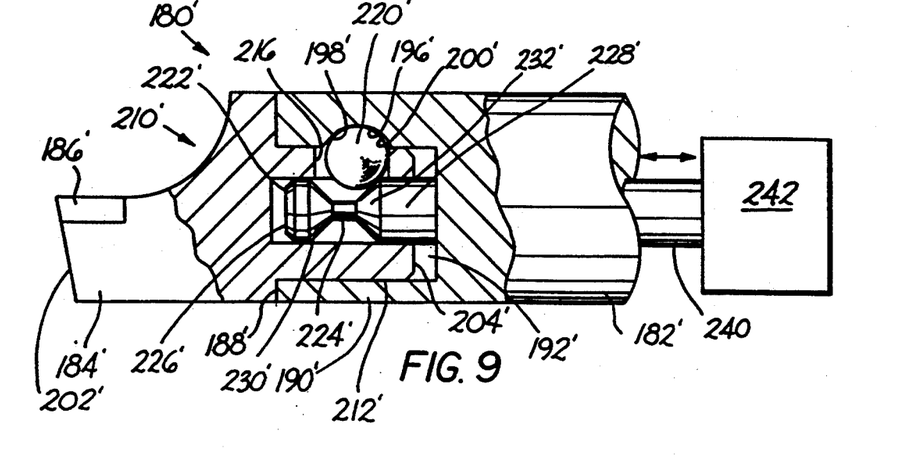
FIG. 9 is a side view of a fifth specific embodiment of the cutting toolholder assembly with a portion removed to illustrate one locking ball and associated structure in a locked condition.

FIG. 9 illustrates a fifth specific embodiment of the cutting tool holding assembly 180'. The structural features of the fifth embodiment that are common with the fourth embodiment are shown in FIG. 9 with the same reference numerals as in FIG. 8, but the reference numerals are primed.

The structure of this fifth embodiment is similar to that of the fourth specific embodiment, except for the difference in the actuation of the driver member 222'. In this regard, the driver member 222' connects to a rod 240 passing through the locking component 182'. An actuator 242, such as a hydraulic cylinder or the like, connects to the rod 240 so as to be able to move the rod 240 in either direction along the longitudinal axis of the locking component 182'.

The operation of this fifth specific embodiment is like that of the above fourth specific embodiment, except that an actuated rod 240 drives the driver member 222' rather than the threaded stud. The rod 240 moves the driver member 222' axially outward (to the left in FIG. 9) to move the locking assembly 210' into the locked condition. The rod 240 moves the driver member 222' axially rearward (to the right in FIG. 9) to move the locking assembly 210' into the unlocked condition. The operation of the driver 222' in conjunction with the locking ball 220' and recess 196' is the same as for the fourth specific embodiment, and for the sake of brevity applicants do not repeat this earlier description.

Figure 10A:
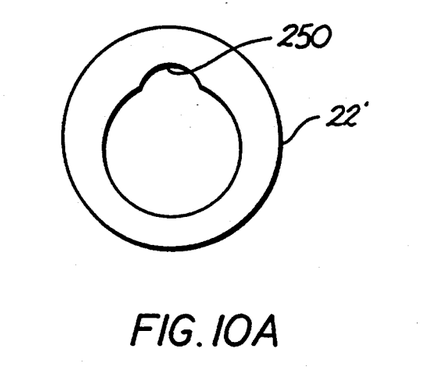
FIGS. 10A, 10B and 10C are each an end view of a modified locking component for the one-ball, two-ball and three-ball arrangements, respectively.
Figure 10B:
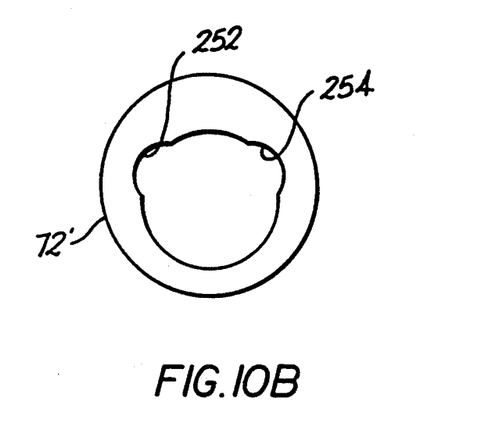
Figure 10C:
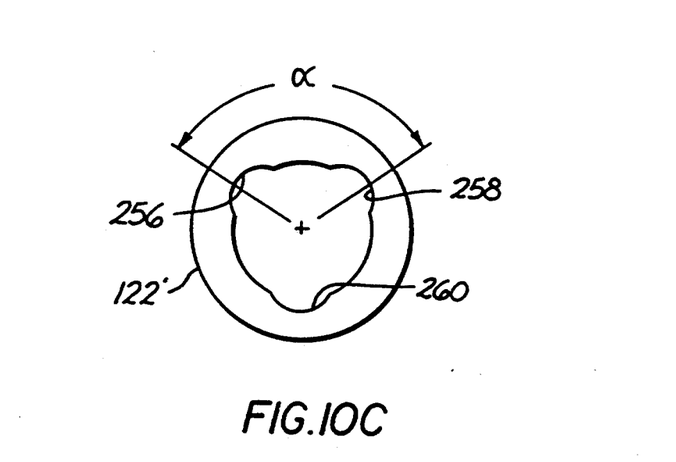

It is important that the tool holding component be correctly aligned with the locking component. One way to achieve such a goal is illustrated in FIGS. 10A, 10B and 10C. These drawings show three specific embodiments of the locking component 22', 72' and 122' for the one- ball, two-ball and three-ball arrangements, respectively. These embodiments are the same as their earlier-described counterparts, except for the presence of alignment channels which are described hereinafter.

FIG. 10A shows a modified locking component 22' for a one-ball arrangement. In this structure, there is an alignment channel 250 which extends from the forward end of the locking component 22' to the recess.

FIG. 10B shows a modified locking component 72' for the two-ball arrangement. In this structure, there are two alignment channels 252, 254. Each channel 252, 254 extends from the forward end of the locking component 72' to its corresponding recess for the locking balls.

FIG. 10C shows a modified locking component 122' for the three-ball arrangement. In this structure, there are three alignment channels 256, 258, and 260. Each channel 256, 258, 260 extends from the forward end of the locking component 122' to its corresponding recess.

Channels 256 and 258 may be disposed at an angle that is not equal to the angle of the apertures for the locking balls so that the tool holding component cannot be incorrectly inserted into the locking component 122' as will be discussed hereinafter.

As discussed above, the locking ball(s) must be flush with the surface of the shank: of the tool holding component to permit insertion or removal of the tool holding component from the locking component. With the modified locking components, each locking ball does not have to be flush with the shank. Instead, each locking ball projects from the surface of the shank so as to register with its corresponding channel. In the case of the three-ball arrangement, the apertures in the shank of the tool holding component are disposed at an angle that is the same as that of the alignment channels.

Once each locking ball registers with its corresponding channel, the tool holding component may be inserted into the locking component By providing the channels that register with the locking ball(s), one facilitates the correct alignment and orientation of the tool holding component with respect to the locking component.

It is now apparent that this invention meets the objectives set forth earlier in this application. This invention provides a toolholder assembly that comprises a minimum number of parts so as to ease the difficulty of manufacture, assembly and operation.

The tool holding component easily and quickly detaches from the locking component. This facilitates the quick change of cutting tool inserts which enhances productivity.

The tool holding component easily aligns with the locking component due to the construction of the locking assembly without the need for alignment pins or the like. The provision of the automatic alignment feature in the locking assembly ensures that the tool holding component is properly aligned with respect to the locking component once these components are connected together.

The locking assembly firmly secures the tool holding component to the locking component so as to resist any movement, whether it be rotational or longitudinal, between these two components. This facilitates the efficient operation of the overall cutting operation.

In the case of the one-ball and two-ball embodiments, the positioning of the recesses in the thicker portions of the bore wall provide additional mass in which to place the recesses. This enhances the holding features of the present invention.

One can make changes and modifications in the above specific embodiments and not depart from the scope of the invention, which applicants intend to limit only by the appended claims.

What is claimed is:

1. A cutting toolholder assembly for holding a cutting tool used in a material removal operation, the assembly comprising:
   a locking component containing a bore substantially defined by a bore wall, said bore having an opening at one end thereof;
   said bore wall containing at least one recess therein;
   a tool holding component including a shank whereby the bore receives the shank, said shank containing a compartment;
   a locking assembly being contained within said compartment, said locking assembly including at least one locking member and positioning means for positioning the locking member into engagement with its corresponding recess;
   said positioning means being internal to the shank compartment and accessible from a surface of the tool holding component not obstructed by the locking component and
   said recess being of a configuration corresponding to the shape of the locking member and adapted to restrict all movement within the bore of that locking member such that when the locking member engages the recess, the recess restrains the locking member so that there is essentially no movement between the older component and the locking component during a material removal operation.

2. The cutting toolholder assembly of claim 1 wherein said locking member comprises a locking ball.

3. The cutting toolholder assembly of claim 2 wherein said positioning means includes a driver ball in operative engagement with a pusher.

4. The cutting toolholder assembly of claim 3 wherein said pusher is movable between an unlocked position where said pusher does not engage said driver ball so that said driver ball does not push said locking ball into engagement with said recess and a locked position where said pusher engages said driver ball which in turn engages said locking ball to push said locking ball into engagement with said recess.

5. The cutting toolholder assembly of claim 4 wherein said pusher comprises a threaded stud positioned within a threaded aperture so that upon rotation said threaded stud moves either toward or away from the driver ball.

6. The cutting toolholder assembly of claim 1 wherein said recess comprises an inclined ramp portion and a spherical portion, said ramp portion being axially outward of said spherical portion.

7. The cutting toolholder assembly of claim 1 including a pair of recesses and a corresponding pair of locking members wherein said locking members comprise locking balls.

8. The cutting toolholder assembly of claim 7 wherein said positioning means includes a driver ball in operative engagement with a pusher; said pusher being movable between an unlocked position where said pusher does not engage said driver ball so that said driver ball does not push each of said locking balls into engagement with the corresponding one of said recesses, and a locked position where said pusher engages said driver ball which in turn engages each of said locking balls to push each of said locking balls into engagement with its corresponding said recess.

9. The cutting toolholder assembly of claim 1 including a trio of recesses and a trio of corresponding locking members wherein said locking members comprise locking balls.

10. The cutting toolholder assembly of claim 9 wherein said positioning means includes a driver ball in operative engagement with a pusher; said pusher being movable between an unlocked position where said pusher does not engage said driver ball so that said driver ball does not push each of said locking balls into engagement with the corresponding one of said recesses, and a locked position where said pusher engages said driver ball which in turn engages each of said locking balls to push each of said locking balls into engagement with its corresponding said recess.

11. The cutting toolholder assembly of claim 1 wherein said locking member includes a locking ball, said positioning means includes a pusher and a driver, said driver having a reduced diameter mediate portion joined by opposite frusto-conical ramp portions to opposite enlarged diameter ends.

12. The cutting toolholder assembly of claim 11 wherein said pusher is movable between an unlocked position and a locked position, when in the unlocked position said pusher does not engage said driver so that said driver does not engage said locking ball to push it into engagement with said recess, and when in the locked position said pusher engages said driver so that said driver engages said locking ball to push it into engagement with said recess.

13. The cutting toolholder assembly of claim 12 wherein said pusher comprises a threaded stud within a threaded aperture.

14. The cutting toolholder assembly of claim 12 wherein said pusher comprises a rod operatively connected to an actuator.

15. The cutting toolholder assembly of claim 1 wherein said locking member comprises a locking ball, and an alignment channel in said bore extending from said one end of the bore to said recess whereby the locking ball registers with the alignment channel to result in the correct alignment between the locking component and the tool holding component.

16. A cutting toolholder assembly comprising: a locking component having a central longitudinal axis;

said locking component containing a generally cylindrical bore substantially defined by a bore wall, said bore having an opening at one end thereof, the bore having a central longitudinal axis that is not coaxial with the central longitudinal axis of the locking component so that a portion of the bore wall is thicker than the average thickness of the bore wall;

said bore wall containing at least one recess in the portion thereof that is thicker than the average thickness of the bore wall;

a holding component including a generally cylindrical shank being received within the bore;

said shank containing a compartment with a locking assembly including at least one locking member and means for moving the locking member into engagement with its corresponding recess;

said means for moving being contained by the shank compartment and accessible from a surface of the tool holding component not obstructed by the locking component; and said recess being of a configuration corresponding to the shape of the locking member and adapted to restrict all movement within the bore of that locking member such that when the locking member engages the recess, the recess restrains the locking member so that there is essentially no movement between the holder component and the locking component during a material removal operation.

17. The cutting toolholder assembly of claim 16 wherein said locking member comprises a locking ball;

said moving means includes a driver ball in operative engagement with a pusher; and said pusher being movable between an unlocked position where said pusher does not engage said driver ball so that said driver ball does not push said locking ball into engagement with said recess, and a locked position where said pusher engages said driver ball which in turn engages said locking ball to push said locking ball into engagement with said recess.

18. The cutting toolholder assembly of claim 17 wherein said usher comprises a threaded stud positioned within a threaded aperture so that upon rotation said threaded stud moves either toward or away from the driver ball.

19. The cutting toolholder assembly of claim 16 wherein said recess comprises an inclined ramp portion and a spherical portion, said ramp portion being axially outward of said spherical portion.

20. The cutting toolholder assembly of claim 16 including a pair of recesses and a corresponding pair of locking members wherein said locking members comprise locking balls, and each of said recesses are in a portion of the bore wall that is thicker than the average bore wall thickness.

21. The cutting toolholder assembly of claim 20 wherein said positioning means includes a driver ball in operative engagement with a pusher; said pusher being movable between an unlocked position where said pusher does not engage said driver ball so that said driver ball does not push each of said locking balls into engagement with the corresponding one of said recesses, and a locked position where said pusher engages said driver ball which in turn engages each of said locking balls to push each of said locking balls into engagement with its corresponding said recess.

22. The cutting toolholder assembly of claim 16 including a trio of recesses and a corresponding trio of locking members wherein said locking members comprise locking balls.

23. The cutting toolholder assembly of claim 22 wherein said positioning means includes a driver ball in operative engagement with a pusher; said pusher being movable between an unlocked position where said pusher does not engage said driver ball so that said driver ball does not push each of said locking balls into engagement with the corresponding one of said recesses, and a locked position where said pusher engages said driver ball which in turn engages each of said locking balls to push each of said locking balls into engagement with its corresponding said recess.

24. A cutting toolholder assembly for holding a cutting tool used in a material removal operation, the assembly comprising:

a locking component having a central longitudinal axis;

said locking component containing a bore substantially defined by a bore wall, said bore having an opening at one end thereof, and the bore having a central longitudinal axis that is not coaxial with the central longitudinal axis of the locking component;

said bore wall containing at least one recess therein;

a holding component including a shank whereby the bore receives the shank, said shank containing a compartment, a locking assembly being contained within said compartment, said locking assembly including at least one locking member and positioning means for positioning the locking member into engagement with its corresponding recess; and said recess being of a configuration corresponding to the shape of the locking member and adapted to restrict all movement within the bore of that locking member such that when the locking member engages the recess, the recess restrains the locking member so that there is essentially no movement between the holder component and the locking component during a material removal operation.

* * * * *